United States Patent [19]
Fujiwara et al.

[11] Patent Number: 5,101,686
[45] Date of Patent: Apr. 7, 1992

[54] AUTOMATIC TRANSMISSION CAPABLE OF EXECUTING CUTBACK CONTROL

[75] Inventors: Takuji Fujiwara; Kouzou Ishii, both of Hiroshima, Japan

[73] Assignee: Mazda Motor Corporation, Hiroshima, Japan

[21] Appl. No.: 609,780

[22] Filed: Nov. 7, 1990

[30] Foreign Application Priority Data

Nov. 15, 1989 [JP] Japan .................. 1-296602

[51] Int. Cl.$^5$ .............................................. B60K 41/06
[52] U.S. Cl. ........................................ 74/844; 74/867; 74/866
[58] Field of Search .................. 74/844, 866, 867; 192/3.57

[56] References Cited

U.S. PATENT DOCUMENTS

| | | | |
|---|---|---|---|
| 3,695,122 | 10/1972 | Irie et al. | 74/866 |
| 3,709,066 | 1/1973 | Burcz | 74/866 |
| 3,731,558 | 5/1973 | Enomoto | 74/867 |
| 4,524,645 | 6/1985 | Tatsumi | 74/867 X |
| 4,676,348 | 6/1987 | Coutant | 192/3.57 |
| 4,733,581 | 3/1988 | Hasegawa et al. | 74/866 X |
| 4,779,489 | 10/1988 | Haley | 74/844 |
| 4,870,581 | 9/1989 | Ito et al. | 74/867 X |
| 4,998,449 | 3/1991 | Baba et al. | 74/844 |
| 5,022,284 | 7/1991 | Shimei | 74/844 |
| 5,029,492 | 7/1991 | Kiuchi | 74/844 |

*Primary Examiner*—Leslie A. Braun
*Assistant Examiner*—Matthew Stavish
*Attorney, Agent, or Firm*—Fish & Richardson

[57] ABSTRACT

An automatic transmission includes a transmission mechanism providing a high speed gear ratio and a low speed gear ratio, a hydraulic control circuit having a cutback device settable in one of a cutback execution state and a cutback suspension state, a primary control device for setting the cutback device in the cutback execution state when the gear ratio is a low speed, and setting the cutback device in the cutback suspension state when the gear ratio is a high speed, a secondary control device for setting the cutback device in the cutback suspension state when the gear ratio is a high speed, and a selection device for selecting the primary control device when the oil temperature is lower than a predetermined value, and selecting the secondary control device when the oil temperature is higher than the predetermined value.

6 Claims, 6 Drawing Sheets

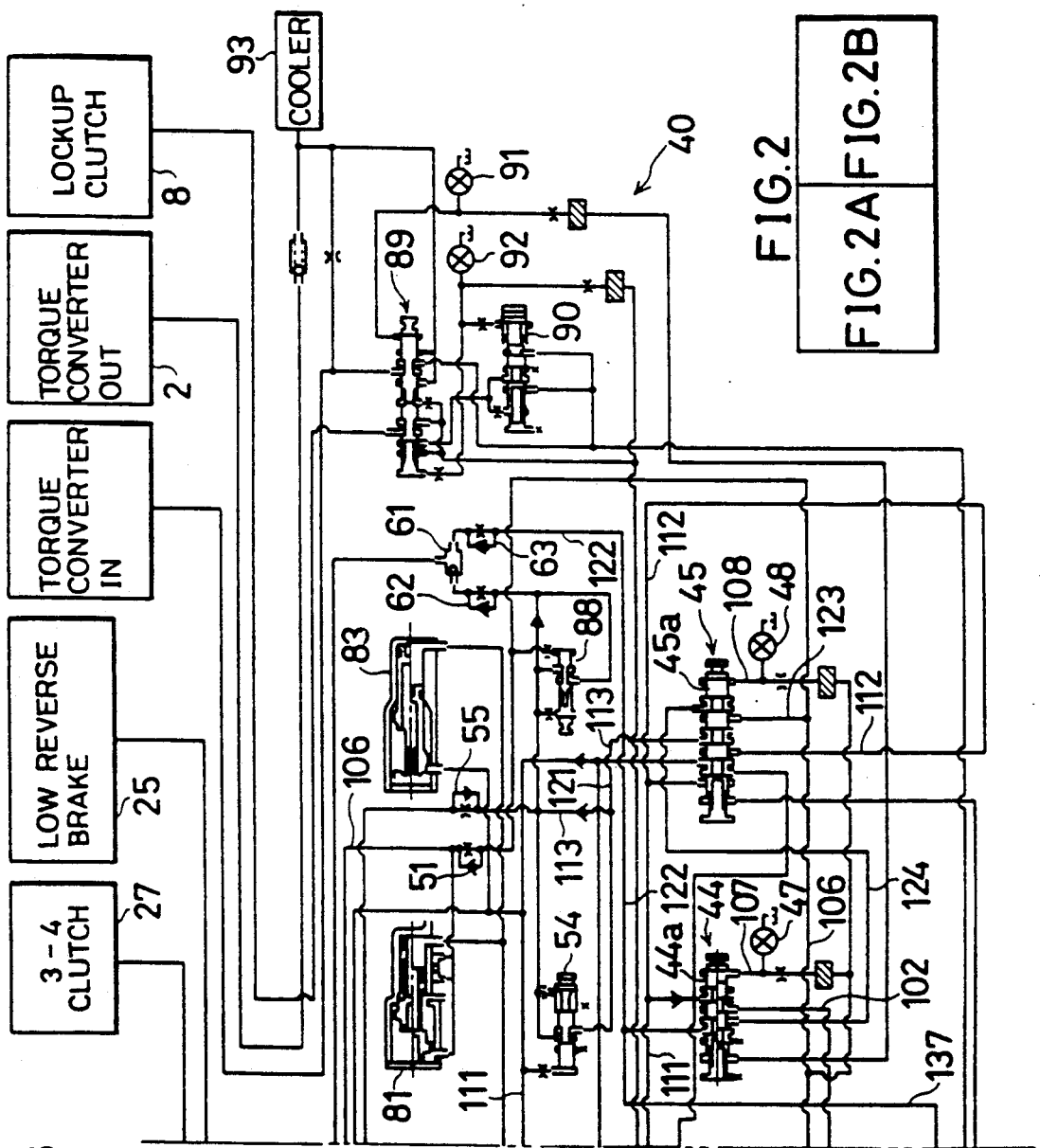

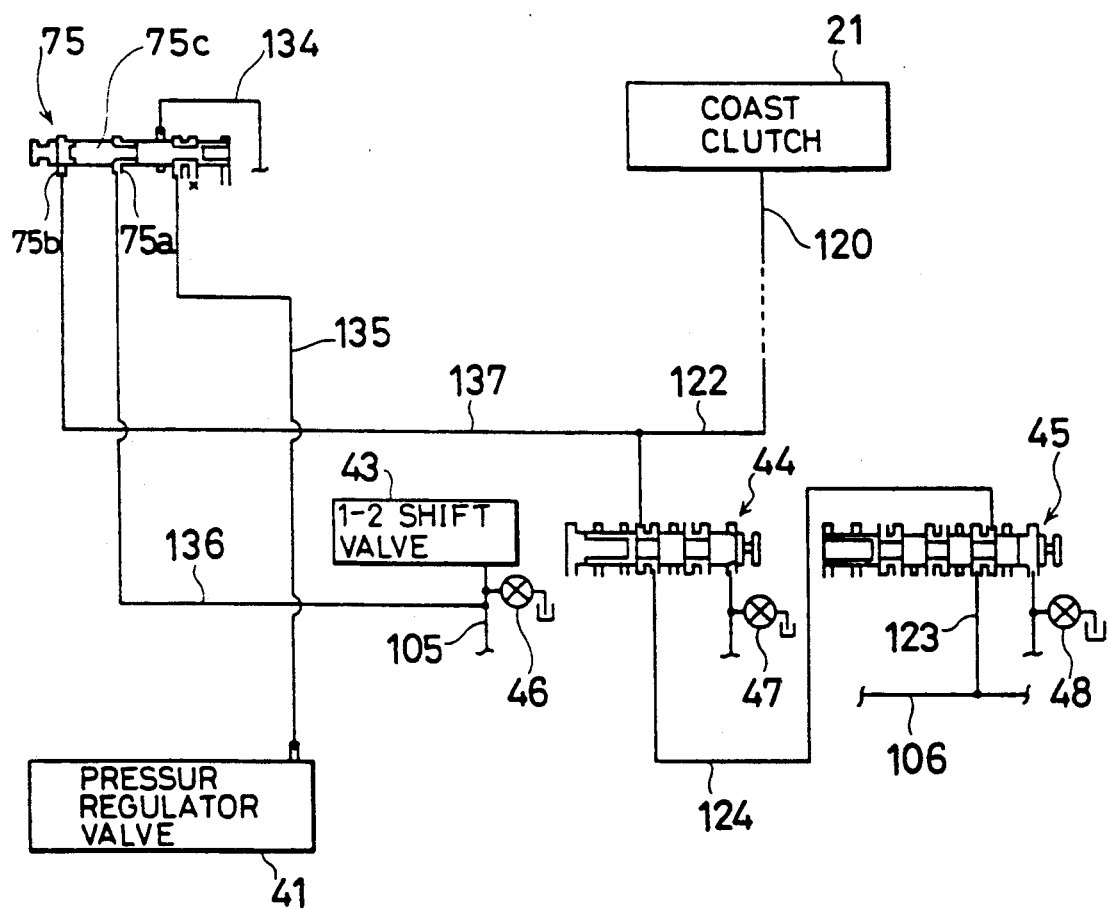

AUTOMATIC TRANSMISSION CAPABLE OF EXECUTING CUTBACK CONTROL

BACKGROUND OF THE INVENTION AND RELATED ART STATEMENT

This invention relates to an automatic transmission, particularly to a line perssure cotrol device provided with a hydraulic control circuit having cutback means.

Generally, an automatic transmission includes a torque converter, a tranmission gear mechanism having a planetary gear unit and friction coupling members for shifting the gear ratio, and a hydraulic control circuit for controlling hydraulic pressure to the friction coupling members. The friction coupling members are clutches, brakes, and the likes. The hydraulic control circuit includes pressure regulator means for regulating the hydraulic oil supplied from an oil pump to an appropriate line pressure, and shift valves for controlling the applying and releasing of coupling pressure to the respective friction coupling members.

In such an automatic transmission, the line pressure has been required to control in accordance with transmitted torque in order to develop the coupling pressure necessary for the transmitted torque, and assure a reduced driving loss of the oil pump and an improved fuel consumption. In view thereof, there has been proposed automatic tranmission provided with a hydraulic control circuit having cutback means. In such automatic transmissions, in addition to usual control of controlling the line pressure in accordance with the throttle opening of the engine, the so-called cutback control is executed in a particular gear ratio. In the cutback control, specifically, the line pressure is reduced when the transmission is set in a particular gear ratio. For example, Japanese Examined Patent Publication No. 46-33050 discloses an automatic transmission having a control valve responsive to hydraulic pressures in shifted gear ratios for reducing the line pressure stepwise as the transmission is progressively set in higher speed gear ratios, In other words, the control valve is capable of executing cutback control.

In the above-mentioned automatic transmission, when the transmission is set in a low speed gear ratio to transmit a great torque, the cutback control is not executed to maintain a high line presssure to develop a necessary coupling pressure. When the transmission is set in a high speed gear ratio to transmit a small torque, the cutback control is executed to assure a reduced driving loss of the oil pump.

However, this control, in which the cutback control is executed at all times when the transmission is set in a high speed gear ratio, gives bad influence to the cooling performance of an oil cooler. Specifically, the temperature of the hydraulic oil supplied to the friction coupling members and the torque converter is likely to rise is running time. The rise of temperature of the hydraulic oil impairs the reliabiltiy of the friction coupling members. For this reason, conventional autmatic transmissions are provided with an oil cooler for cooling the hydraulic oil, However, when the cutback control is executed, a smaller amount of hydraulic oil is supplied to the oil cooler because of the fact that the line pressure is reduced. Consequently, the oil cooler cannot be so sufficiently performed as to keep the hydraulic oil at a lower temperature than a predetermined value, which thus lowers the reliability of the friction coupling members.

SUMMARY OF THE INVENTION

In view of the above-mentioned drawbacks, a main object of the present invention is to provide an automatic tranmission which makes it possible to assure a reduced driving loss of an oil pump and an improved fuel consumption by executing cutback control when the transmission is set in aw hig speed gear ratio, and to further maintain high cooling performance of an oil cooler and high reliability of friction cooling members even when the transmission is set in a high speed gear ratio.

Accordingly, an automatic transmission of the present invention comprises a transmission mechanism having a friction coupling member operable for shifting from a high speed gear ratio to a low speed gear ratio and vice versa, a hydraulic control circuit for developing coupling pressure to the friction coupling member, the hydraulic control circuit having cutback means having a cutback execution state of allowing the hydraulic pressure to reduce and a cutback suspension state of allowing the hydraulic pressure not to reduce, primary control means for controlling the cutback means so as to come in the cutback execution state when the transmission is set in the high speed gear ratio, and come in the cutback suspension state when the transmission is set in the low speed gear ratio, secondary control means for controlling the cutback means so as to come in the cutback suspension state when the transmission is set in the high speed gear ratio, and selection means for selecting the primary control means when the temperature of the hydraulic oil is lower than a predetermined value, and selecting the secondary control means when the temperature of the hydraulic oil is higher than the predetermined value.

In the automatic transmission, when the temperature of the hydraulic oil is lower than the predetermined value, the cutback control is executed to reduce the line pessure in the case of high speed gear ratio, so that a reduced driving loss of the oil pump is obtained. When the temperature of the hydraulic oil is higher than the predetermined value, the cutback control is suspended to supply a usual amount of hydraulic oil to the oil cooler in the case of high speed gear ratio, so tht high cooling performance of the oil cooler is maintained.

This and other objects, features and advantages of the present invention will become more apparent upon a reading of the following detailed description and drawings.

BRIEF DESCRIPTION OF THE INVENTION

FIG. 2A, 2B are schematic diagrams combinedly showing a hydraulic control circuit provided in the automatic transmission:

FIG. 3 is a schematic diagram showing a cutback control circuit; and

DETAILED DESCRIPTION OF A PREFERRED EMBODIMENT OF THE INVENTION

Figure 1:
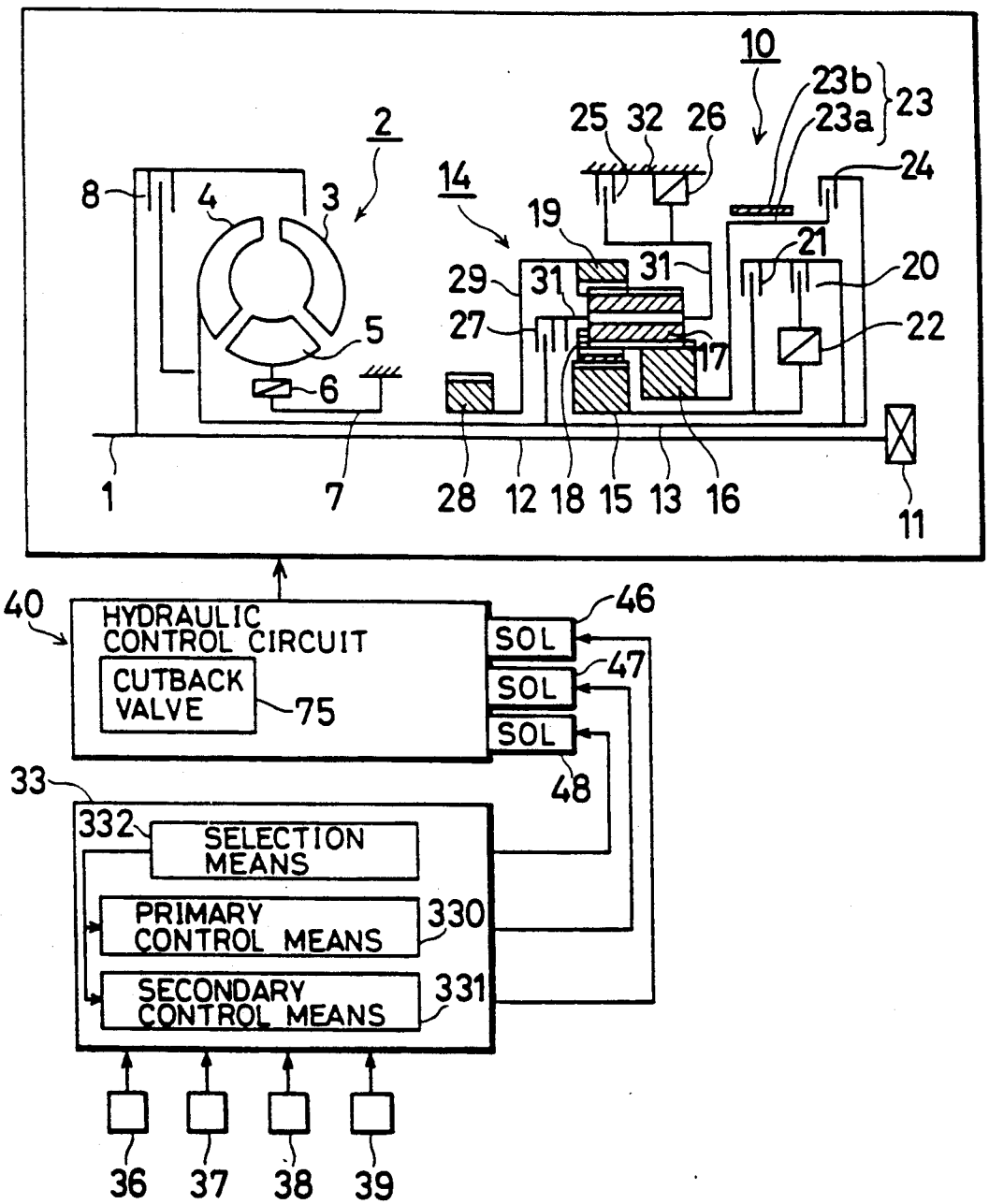
FIG. 1 is a schematic diagram showing an overall construction of an automatic transmission embodying the present invention.

A preferred embodiment of the present invention will be described it reference to the drawings. FIG. 1 shows an overall construction of an automatic transmission embodying the present invention. In FIG. 1, indicated at 2 is a torque converter 2 connected to a crankshaft 1 of an engine, and indicated at 10 is a transmission gear mechanism disposed in an output side of the torque converter 2.

The torque converter 2 includes a pump 3, a turbine 4, and a stator 5. The pump 3 is fixedly connected to the crankshaft 1. The turbine 4 is fixedly connected to a turbine shaft 13. The stator 5 is connected to a stationary shaft 7 by way of a one-way clutch 6. The stationary shaft 7 is integrally attached to a casing of the torque converter 2. Also, in the torque converter 2 is provided a lockup clutch 8 for directly connecting the crankshaft 1 and the turbine shaft 13.

The transmission gear mechanism 10 includes a central shaft 12 for driving an oil pump 11. The central shaft 12 is connected to the crankshaft 1 at one end thereof, and to the oil pump 11 at the other end. The turbine shaft 13. which is connected to the turbine 4 of the torque converter 2 at one end thereof, is in the form of a hollow cylinder. The central shaft 12 is placed in the turbine shaft 13.

A planetary gear unit 14 is mounted on the turbine shaft 13. The planetary gear unit 14 includes a small sun gear 15, a large sun gear 16, a long planetary pinion 17, short planetary pinions 18, and a ring gear 19.

Further, friction coupling members are priovided in the planetary gear unit 14 as follows. A forward clutch 20 and a coast clutch 321 disposed in parallel in the side of the planetary gear unit 14 which is remoter from the crankshaft 1. Between the forward clutch 20 and the small sun gear 15 is provided a first one-way clutch 22. The forward clutch 20 is adopted for connecting and disconnecting the turbine shaft 13 to and from the small sun gear 15 by way of the one-way clutch 22. The coast clutch 21 is adopted for connecting and disconnecting the turbine shaft 13 to and from the small sun gear 15. Accordingly, it will be sen that when the coast clutch 21 is locked, the torque of the wheel can be transmitted to the engine, so that engine brake is allowable.

A 2-4 brake 23 is disposed on an outside of the coast clutch 21. The 2-4 brake 23 includes a brake drum 23a connected to the large sun gear 16 and a brake band 23b wrapped around the brake drum 23a. When the 2-4 brake 23 is put into work, the large sun gear 16 is held in a stationary position. A reverse clutch 24 is provided in a side of the 2-4 brake 23 and at a position between the turbine shaft 13 and the large sun gear 16 to connect and disconnect the turbine shaft 13 to and from the large sun gear 16.

A low and reverse brake 25 is provided between a carrier 31 of the planetary gear unit 14 and a casing 32 of the transmission gear mechanism 10 to connect and disconnect the carrier 31 to and from the casing 32. Also, a secod one-way clutch 26 is provided between the carrier 31 and the casing 32 in prallel to the low and reverse brake 25.

A 3-4 clutch 27 is disposed in the other side of the planetary gear unit 14 which is nearer the crankshaft 1. The 3-4 clutch 27 is adopted for connecting and disconnecting the carrier 31 to and from the turbine shaft 13. An output gear 28 is disposed in a side of the 3-4 clutch 27, and connected to the ring gear 19 by way of an output shaft 29.

The transmission gear mechanism 10 has four forward gear ratios and one reverse gear ratio. A desired gear ratio is obtained by actuating the clutches 20, 21, 24, 27 and the brakes 23, 25 in a predetermined pattern. Table 1 shows a relationship between gear ratios and actuations of the clutches and brakes.

TABLE 1

| RANGE | | CLUTCH | | | | BRAKE | | ONE-WAY CLUTCH | |
|---|---|---|---|---|---|---|---|---|---|
| | | REVERSE (24) | FORWARD (20) | COAST (21) | 3-4 (27) | LOW REVERSE (25) | 2-4 (23) | 2-nd (26) | 1-st (22) |
| P | | | | | | | | | |
| R | | O | | | | O | | | |
| N | | | | | | | | | |
| D | 1st | | O | | | | | O° | O° |
| | 2nd | | O | | | | O | | O° |
| | 3rd | | O | O | O | | | | O° |
| | 4th | | O | | O | | O | | |
| 2 | 1st | | O | | | | | O° | O° |
| | 2nd | | O | O | | | O | | O° |
| | 3rd | | O | O | O | | | | O° |
| 1 | 1st | | O | O | | O | | | O° |
| | 2nd | | O | O | | | O | | O° |

*idle during coasting

The friction coupling members of the transmission gear mechanism 10, i.e., the clutches 20, 21, 24, 27 and the brakes 23, 25, and the lockup clutch 8 of the torque converter 2 are actuated by hydraulic pressure developed by a hydraulic control circuit 40. The hydraulic control circuit 40 includes solenoid valv es 46, 47, and 48 for controlling shift valves. The hydraulic pressure is fed and release to and from the friction coupling members of the transmission gear mechanism 10 by turning on and off the solenoid valves 46, 47, and 48. Further, the hydraulic control circuit 40 includes a cutback valve 75 which constitutes cutback meand for providing a cutback execution state of allowing the line pressure to reduce, and a cutback suspension state of allowing the line presure not to reduce.

To the hydraulic control circuit 40 is electrically connected a control unit 33 for controlling the solenoid valves 46, 47, and 48. To the control unit 33 are electrically connected an inhibitor switch 36 for detecting a selected range, a throttle opening sensor 37 for detecting the throttle opening of the engine, a turbine revolution number sensor 38 for detecting the numbe of revolutions of the turbine 4, and an oil temperature sensor 39 for detecting the temperature off hydraulic oil of the hydraulic control circuit 40.

The control unit 33 receives signals from the inhibitor switch 36, the throttle opening sensor 37, the turbine revolution number sensor 38, and the oil temperature sensor 39, detecting the present running condition of the vehicle, comparing the present running condition with a predetermined gear ratio change patterns to discriminate whether it is necessary to shift the gear ratio, and shifting the gear ratio if necessary.

Further, the control unit 33 includes primary control means 330 for controlling the cutback valve 75 so as to come in the cutback execution state when the transmission is set in a high speed gear ratio, and come in the cutback suspension state when the transmission is set in a low speed gear ratio, secondary control means 331 for controlling the cutback valve 75 so as to come in the cutback suspension state when the transmission is set in a high speed gear ratio, and selection means 332 for the primary control means when the temperature of the hydraulic oil is lower than a predetermined value, and selecting the secondary control means when the temperature of the hydraulic oil is higher than the predetermined value. Also, the secondary control means 331 controls the cutback valve 75 so as to come in the cutback suspension state when the transmission is set in a low speed gear ratio.

Figure 2A:
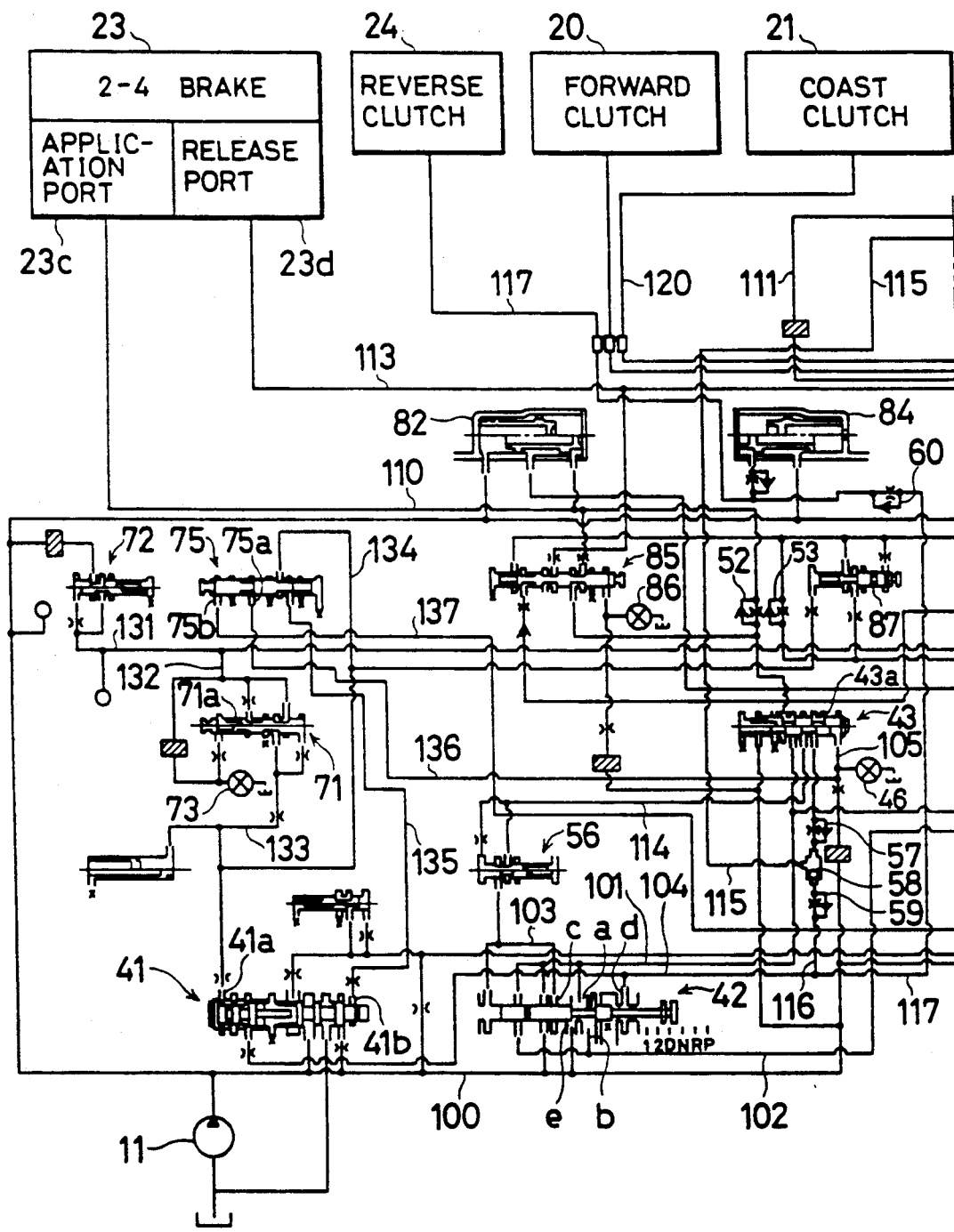

FIGS. 2A, 2B combinedly show a specific construction of the hydraulic control circuit 40 for feeding and releasing controlled hydraulic pressure to and from respective actuators of the clutches 20, 21, 24, 27, and the brakes 23, 25.

An actuator of the 2-4 brake 23 includes a servo piston having an application port 23c and a release port 23d. The 2-4 brake 23 is locked when the hydraulic pressure is fed to the application port 23c only. The 2-4 brake 23 is released when the hydraulic pressure is fed to both ports 23c and 23d, or when no hydraulic pressure is fed to both ports 23c and 23d. Actuators of the clutches 20, 21, 24, 27, and the other brake 25 include usual hydraulic pistons respectively. The clutches 20, 21, 24, 27 and the brake 25 are locked when the hydraulic pressure is fed to the respective pistons.

The hydraulic control circuit 40 has a pressure regulator valve 41, a manual valve 42, 1-2 shift valve 43, 2-3 shift valve 44, and 3-4 shift valve 45. The pressure regulator valve 41 is adopted for regulating the pressure of hydraulic oil discharged from the oil pump 11 to a main line 100 to an appropriate line pressure. The manual valve 42 is actuated by hand and adopted for selecting a range manually. The 1-2 shift valve 43, 2-3 shift valve 44 and 3-4 shift valve 45 are adopted for feeding and discharging the hydraulic pressure to and from the clutches 20, 21, 24, 27 and the brakes 23, 25. In addition, the hydraulic control circuit 40 is provided with a modulator valve 71 and a cutback valve 75 for controlling the pressure regulator valve 41.

The manual valve 42 has an input port e through which the line pressure is introduced from the main line 100, and first to fourth output ports a to d. The manual valve 42 is manually shifted to P, R, N, D, 2 or 1 range. When D range or 2 range is selected, the input port e is communicated with the first and second output ports a and b. When 1 range is selected, the input port e is communicated with the first and third output ports a and c. When R range is selected, the input port e is communicated with the fourth output port d. First to fourth output lines 101 to 104 are respectively connected to the output ports a to d.

The shift valves 43, 44 and 45 have spools 43a, 44a and 45a which are urged rightward by springs (not shown). The spools 43a, 44a and 45a are actuated according to pilot pressures which are controlled by the solenoid valves 46, 47 and 48. Specifically, the 1-2 solenoid valve 46 is connected to a pilot line 105 which is led from the main line 100 and connected to a pilot port of the 1-2 shift valve 43. The 2-3 solenoid valve 47 and the 3-4 solenoid valve 48 are respectively connected to pilot lines 107 and 108. The pilot lines 107 and 108 branching off from a line 106 led from the first output line 101 are respectively connected to pilot ports of the 2-3 shift valve 44 and the 3-4 shift valve 45. When being turned on, the solenoid valves 46, 47, and 48 respectively remove the pilot pressures to permit the spools 43a, 44a, and 45a to slide rightward. When the solenoid valves 46, 47, and 48 are turned off, the pilot pressures are applied to the pilot ports to hold the spools 43a, 44a, and 45a in the respective left positions.

The solenoid valves 46, 47, and 48 are turned on and off in accordance with control signals sent from the control unit 33 on the basis of a map which has been prepared and stored in the control unit 33 according to the range and the vehicle speed, and the throttle opening of the engine. In response to the turning on and off of the solenoid valves 46, 47, and 48, the spools 43a, 44a, and 45a of the shift valves 43, 44, and 45 are slid, the hydraulic passages leading to the 2-4 brake 23, the 3-4 clutch 27, the coast clutch 21 and other parts being consequently changed so that the coupling pressure to the friction coupling members is applied or released as patterns shown in Table 1. Basic combination patterns of turning on and off of the solenoid valves 46, 47, and 48, or basic solenoid patterns are shown in Table 2. The combination patterns show ON-OFF states of the respective solenoid valves 46, 47, and 48 in each gear ratio in D, 2 and 1 ranges. States of the cutback valve 75 in the basic solenoid patterns are shown in the lowest row of Table 2.

TABLE 2

| | RANGE | | | | | | | | |
| --- | --- | --- | --- | --- | --- | --- | --- | --- | --- |
| | D | | | | 2 | | | 1 | |
| | GEAR RATIO | | | | | | | | |
| | 1st | 2nd | 3rd | 4th | 1st | 2nd | 3rd | 1st | 2nd |
| 1-2 SOLENOID VALVE (46) | OFF | ON | ON | ON | OFF | ON | ON | OFF | ON |
| 2-3 SOLENOID VALVE (47) | ON | ON | OFF | OFF | ON | ON | OFF | ON | ON |
| 3-4 SOLENOID VALVE (48) | ON | ON | OFF | ON | ON | OFF | OFF | OFF | OFF |
| CUTBACK VALVE | OFF | ON | ON | ON | OFF | OFF | ON | OFF | OFF |

The line 106 branches off from the first output line 101 which is made to communicate with the main line 100 when one of D, 2 and 1 range is selected. The line 106 is led to the forward clutch 20 by way of a one-way orifice 51. Accordingly, the forward clutch 20 is held in the lock position when one of D, 2 and 1 range is selected.

The first output line 101 is led to the 1-2 shift valve 43. When the 1-2 solenoid valve 46 is turned on, the first output line 101 brought into communication with a servo application line 110. The servo application line 110 is led to the application port 23c of the actuator of the 2-4 brake 23 by way of a one-way orifice 52. When the hydraulic pressure is fed to the application port 23c and is not fed to the release port 23d, the 2-4 brake 23 is locked.

The second output line 102 is made to communicate with the main line 100 when one of D and 2 range is selected. The second output line 102 is led to the 2-3 shift valve 44. The second output line 102 is brought into communication with a 3-4 clutch line 111 when the 2-3 solenoid valve 47 is turned off. The 3-4 clutch line 111 is led to the 3-4 clutch 27 by way of a one-way orifice 53. Accordingly, when one of D and 2 range is selected and the 2-3 solenoid valve 47 is turned off, the 3-4 clutch 27 is locked.

When the second output line 102 is connected to the 3-4 clutch line 111 and the 2-3 solenoid valve 47 is turned off, a line 112 which is communicated with the second output line 102 is led to the 3-4 shift valve 45. When the 3-4 solenoid valve 48 is turned off, the line 112 is communicated with a servo release line 113. The servo release line 113 is led to a release port 23b of the actuator of the 2-4 brake 23 by way of a 2-3 timing valve 54, a one-way orifice 55 and other parts. Accordingly, when one of D and 2 range is selected and the 2-3 solenoid valve 47 and the 3-4 solenoid valve 48 are turned off, the hydraulic pressure is fed to the release port 23d of the 2-4 brake 23, so that the 2-4 brake 23 is released. When the 1-2 solenoid valve 46 is turned on and at least one of the 2-3 solenoid valve 47 and the 3-4 solenoid valve 48 is turned on, in other words, the hydraulic pressure is fed to the application port 23c, the 2-4 brake 23 is locked.

The third output line 103 is made to communicate with the main line 100 when 1 range is selected. The third output line 103 is led to the 1-2 shift valve 43 by way of a low reducing valve 56 and a line 114. When the 1-2 solenoid valve 46 is turned off, the line 114 is brought into communication with a low reverse brake line 115 by way of a one-way orifice 57 and a ball valve 58 and then led to a low reverse brake 25. Accordingly, when 1 range is selected and the 1-2 solenoid valve 46 is turned off, the low reverse brake 25 is locked.

The fourth output line 104 is made to communicate with the main line 100 when R range is selected. The fourth output line 104 is brough into communication with the low reverse brake line 115 by way of a line 116 branching off from the fourth output line 104, a one-way orifice 59, and the ball valve 58. Also, the fourth output line 104 is brought into communication with a reverse clutch line 117 and then led to a reverse clutch 24 by way of a one-way orifice 60. Accordingly, when R range is selected, the low reverse brake 25 and the reverse clutch 24 are held in its lock position.

One of lines 121 and 122 is selectively communicated with a coast clutch line 120 by way of a ball valve 61 and one-way orifices 62, 63. The coast clutch line 102 is led to the coast clutch 21. The line 121 branches off from the servo release line 113. The line 122 is led from the 2-3 shift valve 44. A hydraulic pressure is fed to the line 122 by way of a line 123 and a line 124. The line 123 branches off from the forward clutch line 106 and then is led to the 3-4 shift valve 45. The line 124 is led from the 3-4 shift valve 45 to the 2-3 shift valve 44. When the 3-4 solenoid valve 48 is turned off, the line 123 is brought into communication with the line 124. When the 2-3 solenoid valve 47 is turned on, the line 124 is brought into communication with the line 122.

Accordingly, when both the 2-3 solenoid valve 47 and the 3-4 solenoid valve 48 are turned off, the coast clutch 21 is locked by the hydraulic pressure fed to the coast clutch line 120 by way of the line 121. When the 2-3 solenoid valve 47 is turned on and the 3-4 solenoid valve 48 is turned off, the coast clutch 21 is locked by the hydraulic pressure fed to the coast clutch line 121 by way of the line 122.

The line pressure is controlled as follows. The modulator valve 71 is connected to a line 132. The line 132 branches off from a line 131 which is communicated with the main line 100 by way of a solenoid reducing valve 72. A pilot pressure developed by a duty solenoid valve 73 is fed to one end of a spool 71a of the modulator valve 71 so that a modulator pressure is developed according to a duty cycle of the duty solenoid valve 73. The duty cycle of the duty solenoid valve 73 is changed according to the throttle opening of the engine. The modulator pressure corresponding to the duty cycle is fed to a booster port 41a of the pressure regulator valve 41 by way of a modulator line 133. Accordingly, the line pressure is changed in accordance with the throttle opening of the engine.

On the other hand, a line 134 branching off from the modulator line 133 is led to the cutback valve 75. A cutback line 135 is led from the cutback valve 75 and then connected to a pressure reduction port 41b of the pressure regulator valve 41. The cutback line 135 is brought into communication with or shut off from the line 134 according to actuator of the cutback valve 75. When the cutback line 135 is communicated with the line 134, the modulator pressure is applied to the pressure reduction port 41b of the pressure regulator valve 41 so that the line pressure is reduced, i.e., the cutback control is executed. When the cutback line 135 is shut off from the line 134, but be communicated with a drain port, the cutback control is not executed. The cutback valve 75 has first and second pilot ports 75a and 75b. Lines 136 and 137 are respectively connected to the pilot ports 75a and 75b. The line 136 branches off from the pilot line 105 which is led to the 1-2 shift valve 43. The line 137 branches off from the line 122 between the 2-3 shift valve 44 and the coast clutch line 120.

Further, the hydraulic control circuit includes accumulators 81, 82, 83, and 84, a timing valve 85, a bypass valve 87, and a coast control valve 88. The accumulators 81, 82, 83, and 84 are led to the forward clutch 20, 2-4 brake 23, 3-4 clutch 27 and reverse clutch 24 to reduce shocks which occur when actuating them. The timing valve 85 is adopted for controlling the timing of feeding and releasing of the hydraulic pressure during each gear shifting. The timing valve 85 is controlled by a solenoid valve 86. The bypass valve 87 is provided in a line which bypasses the one-way orifice 53 of the 3-4 clutch line 111 for and adopted for adjusting the timing of the hydraulic pressure to the 3-4 clutch. The coast control valve 88 is provided in the line 121 which branches off from the servo release line 113 and adopted for adjusting the timing of the hydraulic pressure to the coast clutch 21. Moreover, the hydraulic control circuit 40 includes a lockup shift valve 89, a lockup control valve 90, a lockup solenoid valve 91, a duty solenoid valve 92 to control the lockup clutch 8.

Furthermore, the hydraulic control circuit 40 includes an oil cooler 93. The hydraulic oil supplied to the torque converter 2 and other parts by way of lines communicating with the main line 100 is introduced to the oil cooler 93 in which the hydraulic oil is in turn cooled.

FIG. 3 shows a cutback system of the hydraulic control circuit 40. A spool 75c of the cutback valve 75 has right and left spool portions which are arranged in series. The right and left spool portions are urged leftward by a spring (not shown). A first pilot port 75a is provided between the right and left spool portions. A second pilot port 75b is provided on the left end of the spool 75c. When the 1-2 solenoid valve 46 is turned off and the pilot pressure for the 1-2 shift valve 43 is applied to the first pilot port 75a by way of a line 136, the right spool portion is moved rightward. When the 2-3 solenoid valve 47 is turned on, the 3-4 solenoid valve 48 is turned off and the hydraulic pressure of the line 122 is applied to the second pilot port 75b by way of a line 137, the both spool portions are moved rightward. In these cases, the cutback line 135 is communicated with the drain port, so that the cutback control is not executed. When the hydraulic pressure is applied to neither of the pilot ports 75a and 75b, the cutback line 135 is communicated with the line 134, so that the cutback control is executed.

In other words, when the 1-2 solenoid valve 46 is turned off, or when the 2-3 solenoid valve 47 is turned on and the 3-4 solenoid valve 48 is turned off, the cutback control is not executed. In other cases, the cutback control is executed. In the basic solenoid patterns of Table 2, when the transmission is in first of D, 2 or 1 range and in second of 2 or 1 range, the cutback control is not executed. When the transmission is in second to fourth of D range and third of 2 range, the cutback control is executed.

The primary cutback control means 331 is performed on the basis of the basic solenoid patterns of Table 2. The cutback control is not executed in second of 2 or 1 range because there is a necessity that the line pressure should be increased in order to prevent the 2-4 brake 23 from slipping due to reverse torque applied thereto during the engine brake when the 2-4 brake including a band brake is locked and the coast clutch 21 is locked.

In second or third gear ratio, however, the hydraulic control circuit 40 can put the cutback valve 75 either into the cutback execution state or in the cutback suspension state according to selection of a secondary solenoid pattern shown in Table 3.

turned on and the solenoid valve 48 is turned off, the cutback control is not executed in second. In a pattern 3A in which the solenoid valve 46 is turned on, the solenoid valve 47 is turned off and the solenoid valve 48 is turned off, the cutback control is executed in third. In a pattern 3B in which all the solenoid valves 46, 47, and 48 are turned off, the cutback control is not executed in third.

When the oil temperature is lower than a predetermined value in second of D range and third of D and 2 ranges, the patterns 2A and 3A, being identical with the basic solenoid patterns in Table 2, are respectively selected to execute the cutback control. When the oil temperature is higher than the predetermined value, the patterns 2B and 3B are respectively selected to put the cutback valve 75 in the cutback suspension state. These selections are performed by the selection means 332.

When the solenoid pattern is changed from 2A to 2B in second of D range, the coast clutch 21 is changed from the released state to the locked state. However, this change will not give bad influence to the vehicle running. When the solenoid pattern is changed from 3A to 3B in third, the feeding and releasing of the hydraulic pressure to and from the application port 23c of the 2-4 brake 23 is changed. However, since a servo release pressure is fed to the release port 23d, the 2-4 brake 23 is held in the released state.

Figure 4A:
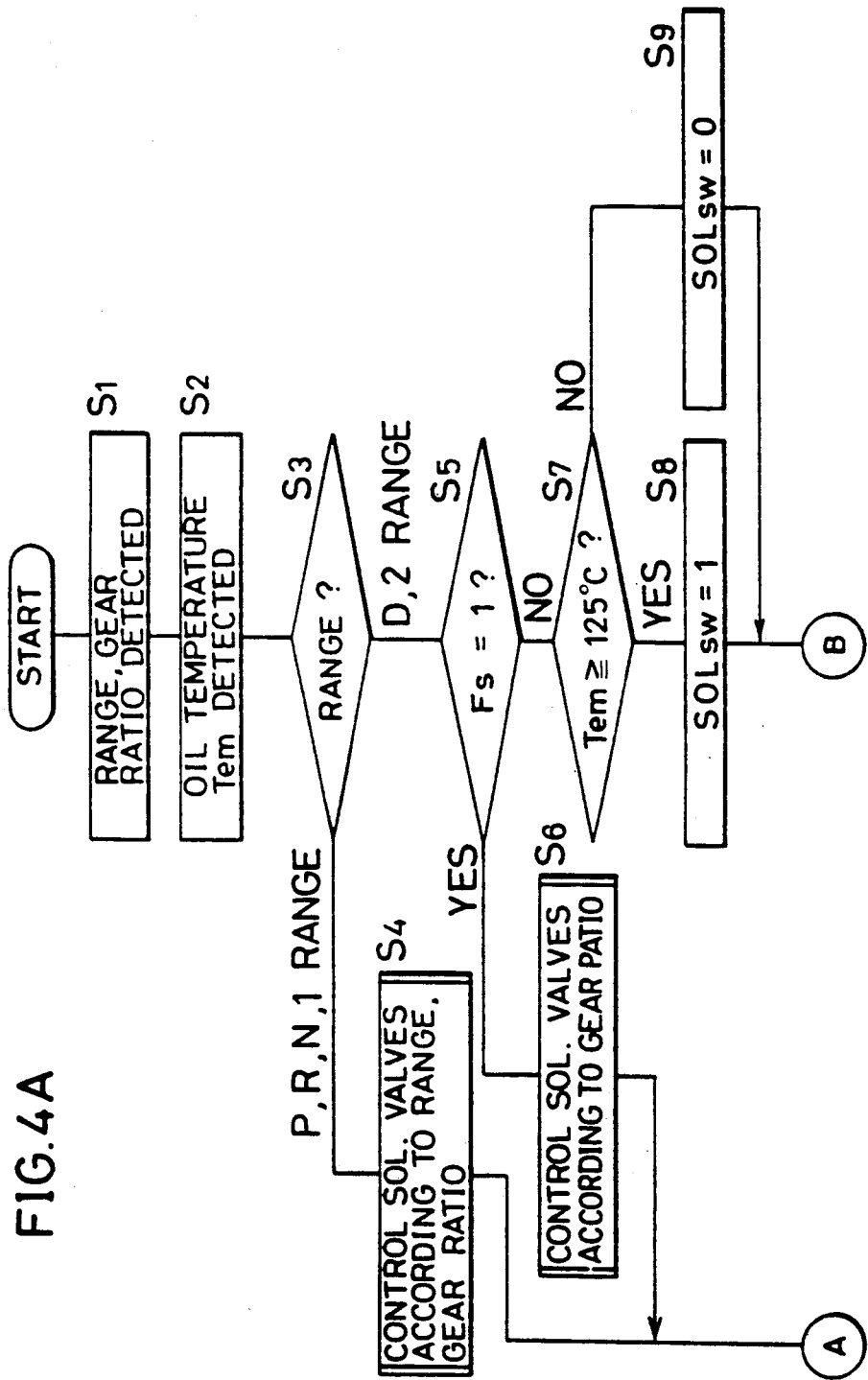
FIGS. 4A, 4B are flow charts combinedly showing a control operation of the automatic transmission.
Figure 4B:
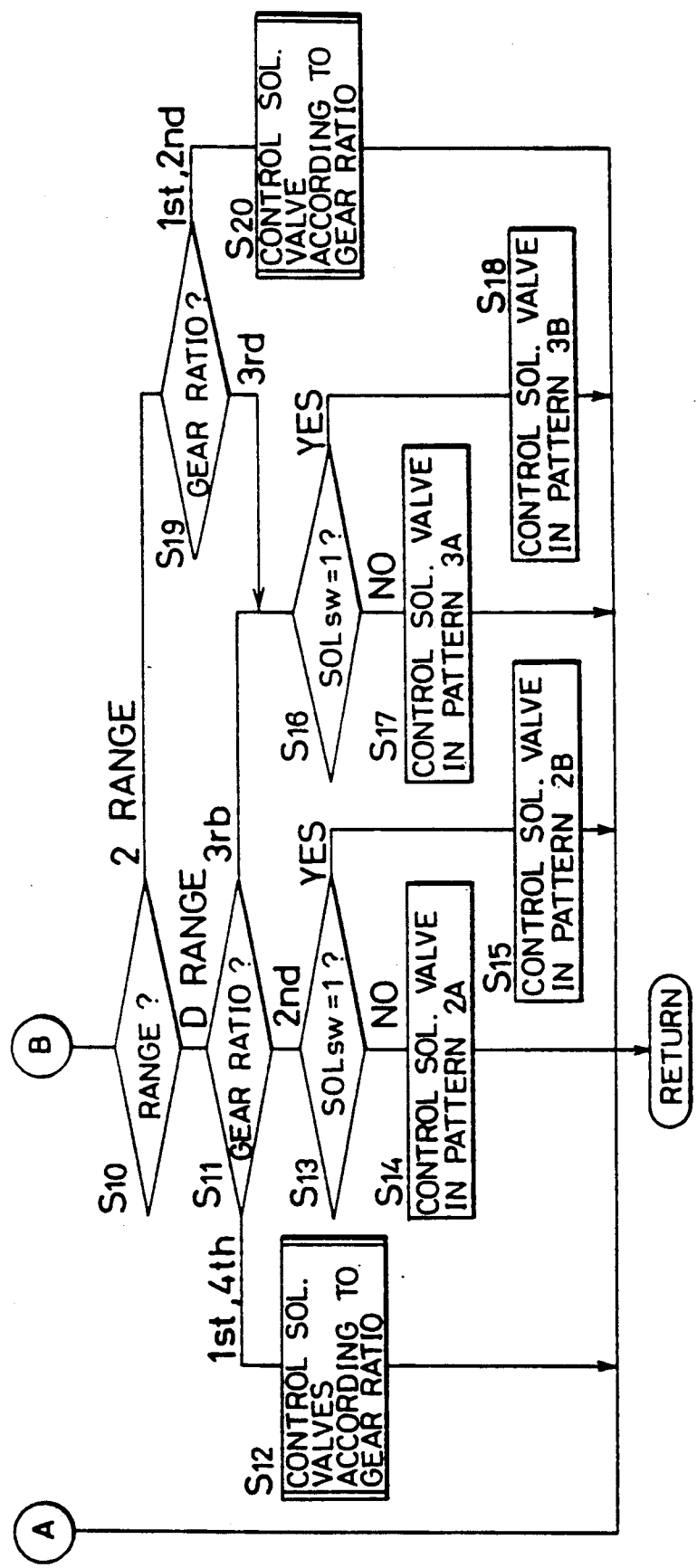

FIGS. 4A, 4B combinedly show an operation of the control unit for controlling the 1-2 solenoid valve 46, the 2-3 solenoid valve 47 and the 3-4 solenoid valve 48.

First, in Step S1, a current range and a current gear ratio of the automatic transmission are detected, and in Step S2, the oil temperature Tem is detected. Subsequently, this routine proceeds to Step S3 in which it is discriminated which one of D and 2 ranges, or one of P, R, N and 1 ranges is selected. If one of P, R, N and 1 ranges is selected, the routine proceeds to Step S4 in which the solenoid valves 46, 47, and 48 are controlled in accordance with the basic solenoid pattern corresponding to the range and gear ratio in Table 2.

If one of D and 2 ranges is selected, this routine proceeds to Step S5 in which it is discriminated whether a shift flag Fs is "1". When the gear ratio is being shifted, the shift flag Fs is set at "1". When the gear ratio is not being shifted, the shift flag is set at "0". This flag setting is carried out by shift discriminator means (not shown).

If the shift flag Fs is "1", this routine proceeds to Step S6 in which the solenoid valves 46, 47, and 48 are controlled in accordance with the basic solenoid pattern in Table 2, in other words, are changed in accordance with the basic solenoid pattern. During the time of

TABLE 3

|  | GEAR RATIO | | | |
| --- | --- | --- | --- | --- |
|  | 2nd | | 3rd | |
|  | PATTERN | | | |
|  | PATTERN 2A | PATTERN 2B | PATTERN 3A | PATTERN 3B |
| 1-2 SOLENOID VALVE (46) | ON | ON | ON | OFF |
| 2-3 SOLENOID VALVE (47) | ON | ON | OFF | OFF |
| 3-4 SOLENOID VALVE (48) | ON | OFF | OFF | OFF |
| CUTBACK VALVE (75) | ON | OFF | ON | OFF |

Specifically, in a pattern 2A in which all the solenoid valves 46, 47, and 48 are turned on, the cutback control is executed in second. In a pattern 2B in which the solenoid valve 46 is turned on, the solenoid valve 47 is shifting, the solenoid pattern is not changed from the basic solenoid pattern of Table 2 to the secondary solenoid pattern of Table 3 based on the oil temperature because of avoiding shocks and timing errors which are liable to occur due to changing of the solenoid pattern.

If the shift flag is not "1", that is, one of D and 2 ranges is selected and the shifting is not being practiced, this routine proceeds to Step S7 in which the oil temperature Tem is equal to or more than a predetermined value, in this embodiment, 125° C. If the oil temperature Tem is equal to or more than the predetermined value, this routine proceeds to Step S8 in which the solenoid switch SOLsw is set at "1", and proceeds to Step S10. If the oil temperature Tem is less than the predetermined value, this routine proceeds to Step S9 in which the solenoid switch SOLsw is set at "0", and proceeds to Step S10. In Step S10, it is discriminated which range is selected, D range or 2 range.

If D range is selected in Step S10, this routine proceeds to Step S11 in which it is discriminated which gear ratio is set. If the gear ratio is set in first, fourth, this routine proceeds to Step S12 in which the solenoid valves 46, 47, and 48 are controlled in accordance with the basic solenoid pattern of Table 2.

If the gear ratio is set in second, this routine proceeds to Step S13 in which it is discriminated whether the solenoid switch SOLsw is "1". If the solenoid switch SOLsw is not "1", that is, the oil temperature is less than the predetermined value, this routine proceeds to Step S14 in which the solenoid valves 46, 47, and 48 are controlled in accordance with the secondary solenoid pattern 2A of Table 3 to attain second with the cutback control being executed, and returns to the initial step.

If the solenoid switch SOLsw is "1", that is, the oil temperature Tem is equal to or more than the predetermined value, this routine proceeds to Step S15 in which the solenoid valves 46, 47, and 48 are actuated in accordance with the secondary solenoid pattern 2B of Table 3 to attain second with the cutback control not being executed, and return to the initial step.

If the transmission is set in third in D range in Step S11, this routine proceeds to Step S16 in which it is discriminated whether the solenoid switch SOLsw is not "1". If the solenoid switch SOLsw is not "1", this routine proceeds to Step S17 in which the solenoid valves 46, 47, 48 are actuated in accordance with the secondary solenoid pattern 3a of Table 3 to attain third with the cutback control being executed, and returns to the initial step. If the solenoid switch SOLsw is "1", this routine proceeds to Step S18 in which the solenoid valves 46, 47, and 48 are actuated in accordance with the secondary solenoid pattern 3B of Table 3 to attain third with the cutback control not being executed, and returns to the initial step.

If 2 range is selected in Step S10, this routine proceeds to Step S19 in which it is discriminated which gear ratio is set. S19. If the gear ratio is third, this routine proceeds to Step S16. Thereafter, the same operations are practiced as the case of third in D range. If the gear ratio is one of first and second, this routine proceeds to Step S20 in which the solenoid valves 46, 47, and 48 are actuated in accordance with the basic solenoid pattern of Table 2, and returns to the initial step.

In this embodiment, the cutback control is not executed in first of D, 2 and 1 ranges and second of 2 and 1 ranges. In other cases, the cutback control is executed. Consequently, in low speed gear ratios in which a great torque is transmitted, the line pressure can be kept so high as to develop the coupling pressure necessary for the great transmission torque. On the other hand, in high speed gear ratios in which a small torque is transmitted, the line pressure is decreased to an appropriate value by the cutback control. Accordingly, the oil pump 11 is operated with a reduced driving loss.

When the oil temperature is equal to or more than the predetermined value in second of D range and third of D and 2 ranges, the cutback control is changed from the cutback execution state to the cutback suspension state by changing the solenoid pattern. Consequently, the line pressure is increased, so that a not-reduced amount of the hydraulic oil is supplied to the oil cooler 93 and high cooling performance of the oil cooler 93 is maintained to lower the temperature of the hydraulic oil. When the oil temperature is lowered to the predetermined value, the cutback control is executed again.

As described above, an automatic transmission of the present invention includes a hydraulic control circuit having a cutback valve. Basically, when the transmission is set in a low speed gear ratio, the cutback control is not executed, and when the transmission is set in a high speed gear ratio, the cutback control is executed. However, if the temperature of the hydraulic oil is higher than a predetermined value, the cutback control is not executed even when the transmission is set in a high speed gear ratio. Accordingly, the automatic transmission can assure a reduced driving loss of the oil pump owing to the fact that when the transmission is set in a high speed gear ratio, the cutback control is executed so as to reduce the line pressure. Also, the automatic transmission can maintain high cooling performance of the oil cooler and assure high reliability of friction coupling members owing to the fact that if the temperature of the hydraulic oil is higher than a predetermined value, the cutback control is not executed even when the transmission is set in a high speed gear ratio.

Although the present invention has been fully described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. An automatic transmission capable of executing cutback control comprising:
   a transmission mechanism having a friction coupling member operable for shifting from a high speed gear ratio to a low speed gear ratio;
   a hydraulic control circuit for controlling the friction coupling member by use of hydraulic oil, the hydraulic control circuit including cutback means having a cutback execution state of allowing the hydraulic pressure of the hydraulic oil to reduce and a cutback suspension state of allowing the hydraulic pressure not to reduce;
   primary control means for controlling the cutback means so as to come in the cutback execution state when the transmission is set in the high speed gear ratio, and come in the cutback suspension state when the transmission is set in the low speed gear ratio;
   secondary control means for controlling the cutback means so as to come in the cutback suspension state when the transmission is set in the high speed gear ratio; and selection means for selecting the primary control means when the temperature of the hydraulic oil is lower than a predetermined value, and selecting the secondary control means when the temperature of the hydraulic oil is higher than the predetermined value.

2. An automatic transmission according to claim 1, wherein the secondary control means further controls the cutback means so as to come in the cutback suspension state when the transmission is set in the low speed gear ratio.

3. An automatic transmission according to claim 1, wherein the selection means selects the primary control means irrespective of the temperature of the hydraulic oil while the gear ratio is being shifted.

4. An automatic transmission according to claim 1, wherein the hydraulic control circuit includes a pressure regulator valve for regulating the hydraulic pressure, and the cutback means includes a cutback valve changable from the cutback execution state to the cutback suspension state and vice versa for controlling the pressure regulator valve.

5. An automatic transmission according to claim 4, wherein the hydraulic control circuit further includes:
   a plurality of shift valves for controlling the feeding and releasing of the hydraulic pressure to and from the friction coupling member;
   a plurality of solenoid valves controllable by the primary control means and the secondary control means for controlling the plurality of shift values respectively, each solenoid valve having two different operation states;
   whereby the cutback valve is charged from the cutback execution state to the cutback suspension state or vice versa by charging one combination of operation states of the plurality of solenoid valves to another.

6. An automatic transmission according to claim 1, wherein the selection means includes an oil temperature sensor provided in the hydraulic control circuit for detecting the temperature of the hydraulic oil in the hydraulic control circuit.

* * * * *